July 17, 1962 E. T. ANDERSON ET AL 3,044,465
MIXING AND DISPENSING APPARATUS
Filed May 8, 1958 2 Sheets-Sheet 1

INVENTORS
EDITH T. ANDERSON
JACK E. McLAUGHLIN
BY
Boykin, Mohler & Wood
ATTORNEYS

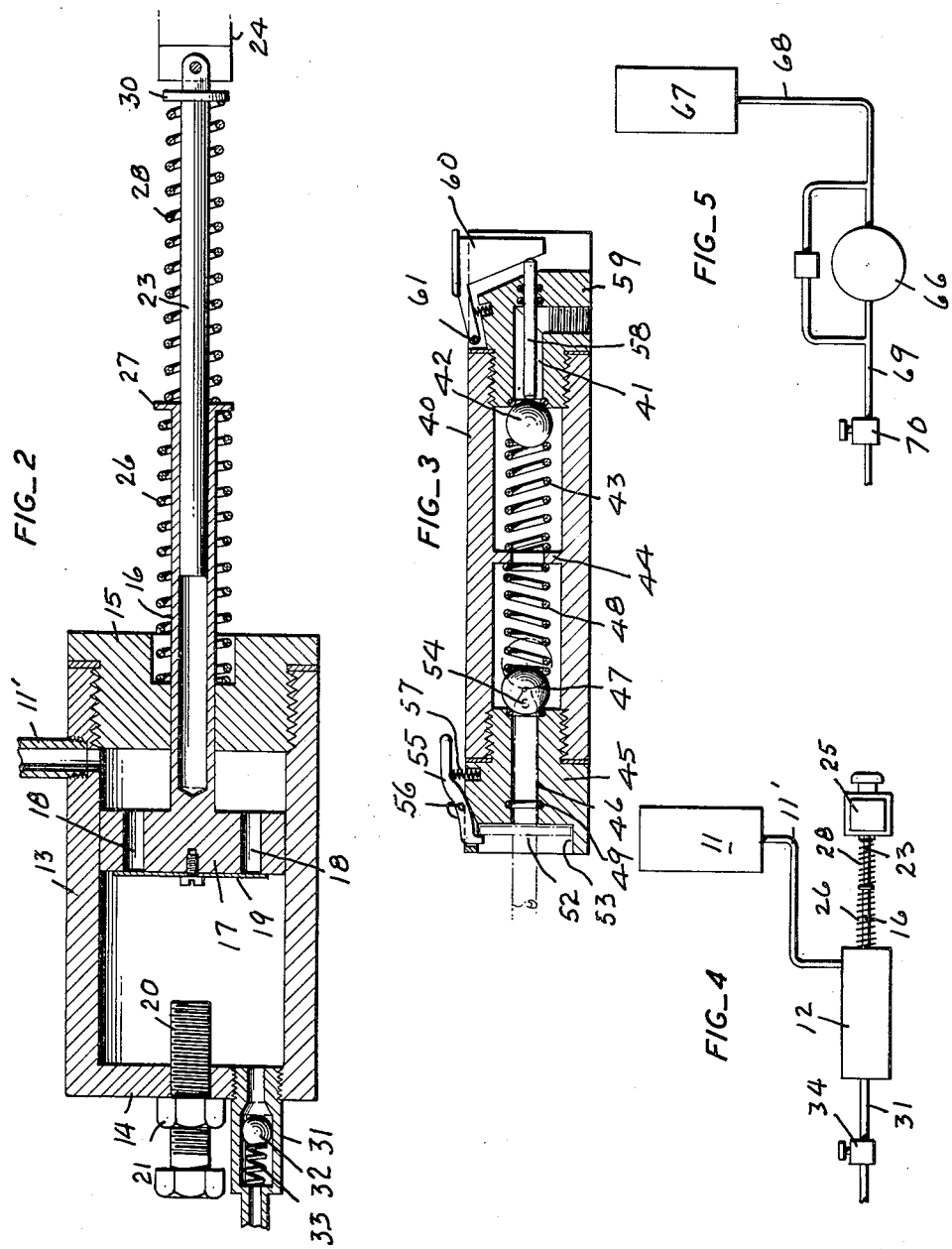

United States Patent Office 3,044,465
Patented July 17, 1962

3,044,465
MIXING AND DISPENSING APPARATUS
Edith T. Anderson and Jack E. McLaughlin, Yuba City, Calif., assignors to Andermac, Yuba City, Calif., a corporation
Filed May 8, 1958, Ser. No. 733,901
6 Claims. (Cl. 128—230)

This invention relates to mixing and dispensing apparatus, and has for one of its objects the provision of a simple, safe, and easily manipulated apparatus adapted for use in the maternity department of hospitals in the delivery room, and which device is adapted for manipulation and use by the mother herself after delivery of the baby.

Another object of the invention is the provision of a simple, safe and easily manipulated apparatus adapted for any use where the delivery of a chemical solution of predetermined strength and at a safe, uniform and positive pressure is desired for internal irrigation or for washing of deep wounds or skin abrasions, or in operating rooms for preparing the skin surface for surgery, in medical or dental departments, or in the home.

Another object of the invention is the provision of apparatus adapted for mixing liquids and chemicals in different combinations to be delivered at controlled pressures, concentrations and temperatures.

A still further object of the invention is the provision of apparatus adapted to mix and dispense liquids and chemicals intermittently and to automatically follow the dispensing of such mixture by a clear rinse of water or by liquid from one source only unmixed with another liquid.

An added object of the invention is the provision of apparatus adapted to mix liquids and to dispense such mixture of liquids, intermittently, in a predetermined amount of the mixture so dispensed with each operation of the apparatus, and in which apparatus the temperature of the mixture is at substantially a predetermined controllable temperature.

Other objects and advantages will appear in the description and in the drawings.

In the drawings, FIG. 1 is a semi-diagrammatic part sectional, part elevational view of one form of the invention.

FIG. 2 is an enlarged sectional view taken through one pump in the system.

FIG. 3 is an enlarged sectional view taken through the manually actuatable dispensing valve.

FIGS. 4 and 5 are semi-diagrammatic elevational views of the two pump systems that may be employed in the apparatus, one for intermittent dispensing of a mixture, and the other for continuous dispensing of a mixture.

Figure 1:
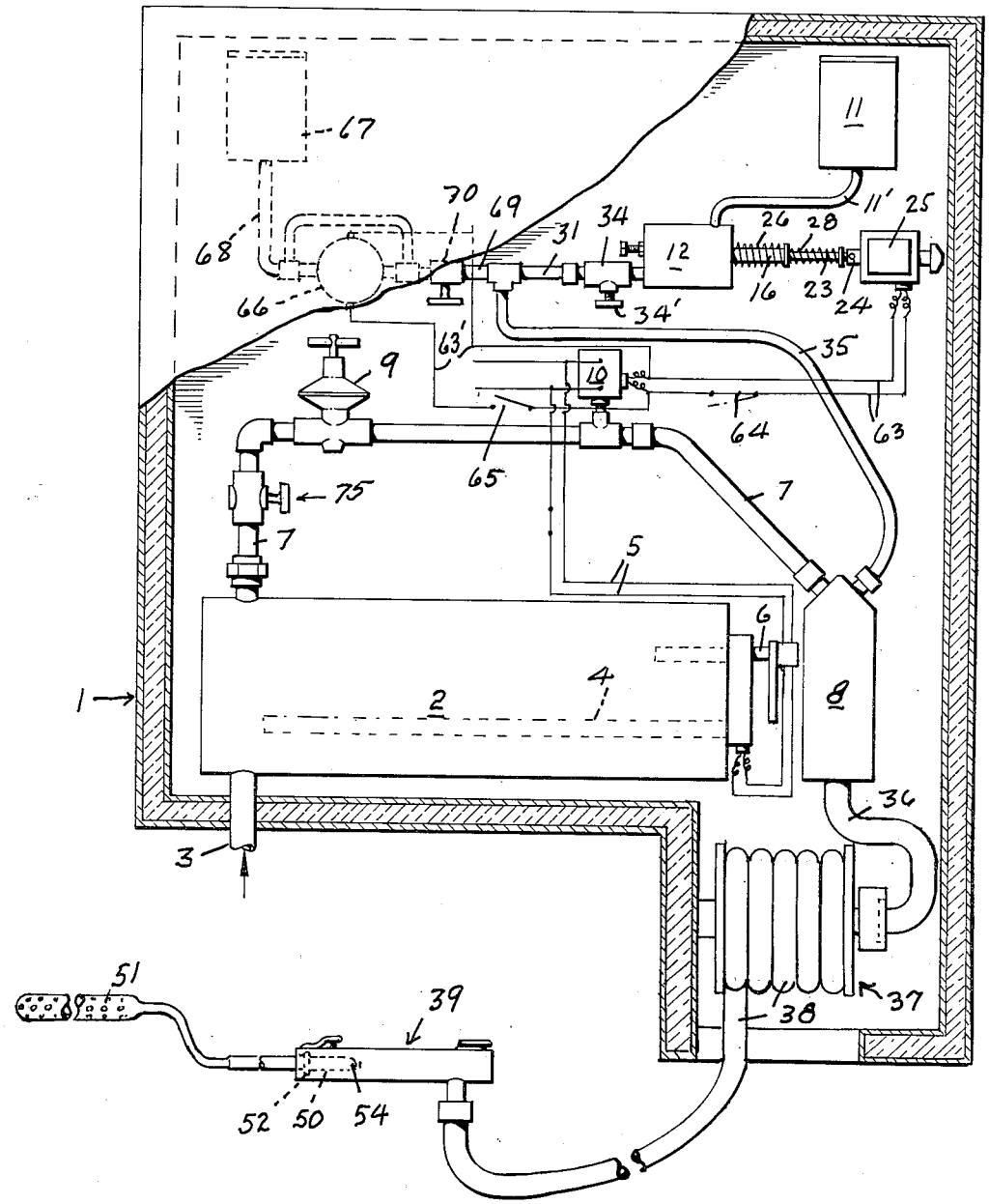

In detail, the apparatus illustrated in FIG. 1 comprises a heat insulated housing 1 having therein an uninsulated tank 2 for holding, under pressure from an inlet pipe 3, a supply of water. Pipe 3 may connect with any suitable source of water under pressure, such as the city water supply.

The water in tank 2 is heated by an electrical heating element 4 in an electrical circuit 5, and an adjustable conventional thermocouple or electrical thermostat 6 in said circuit and extending into tank 2 functions to control the electrical heating element for maintaining the water in tank 2 at the desired temperature.

Connected with tank 2 is a discharge pipe 7 for conducting the heated water in tank 2 to a mixing chamber 8. An ordinary adjustable pressure regulator 9 is in pipe 7 and between the pressure regulator 9 and the mixing chamber 8 is an ordinary pressure actuated switch 10 that is adapted for actuation, as will later be explained more in detail, upon a pressure drop in the portion of pipe 7 leading from the pressure regulator to the mixing chamber.

The apparatus also includes a receptacle 11 adapted to hold the chemical solution that is to be mixed with the water. A pipe 11' leads from the receptacle 11 into a reciprocating solenoid actuated pump 12.

The pump 12, as best seen in FIG. 2, comprises a horizontally elongated cylinder 13 having a head 14 at one end thereof and a head 15 at the opposite end. Head 15 is centrally apertured for slidably passing a hollow piston rod 16 therethrough, which rod is connected within the cylinder with a piston 17 reciprocable within the latter. This piston may be apertured at 18 for permitting fluid to pass therethrough and a flexible valve 19 carried by said piston and extending over apertures 18 at the side thereof opposite to the rod 16 is adapted to permit the fluid to pass through the piston only on movement of the piston to the right, as seen in FIG. 2, or a movement in which the rod 16 is leading, and to close the apertures 18 when the piston is moved to the left, with the rod 16 trailing it.

The pipe 11' opens into the end of the cylinder 13 adjacent to the head 15.

An adjustable stop screw 20 extends through the head 14 and the degree to which said screw extends into the cylinder determines the length of the stroke of the piston. Upon the piston 17 striking the end of the screw that projects into the cylinder, the movement of the piston to the left as seen in FIG. 2 will stop. A lock nut 21 on the screw 20 outside the head 14 is adapted to be tightened against the head 14 when the screw is in adjusted position to hold it in said position.

A solenoid rod 23 telescopically extends into the piston rod 16 through the outer open end of the latter and projects outwardly of said rod 16. This rod 23 connects at its outer end with the movable core 24 within a solenoid coil 25 (FIG. 1).

A coil spring 26 (FIG. 2) is positioned around the end of the piston rod 16 that projects outwardly of head 15, and said spring reacts between head 15 and a radially outwardly projecting flange 27 on the outer end of the rod 16.

A second coil spring 28 is around the end of the solenoid rod 23 that projects outwardly of the piston rod 16, which coil spring 28 reacts between the flange 27 and a flange or collar 30 that is on rod 23 adjacent to its connection with the core 24.

The spring 26 functions to yieldably return piston 17 to a position adjacent to the head 15 when the solenoid is de-energized, while spring 28 functions to move the core to its starting position upon the solenoid coil being de-energized. These springs, of course, provide a yieldable drive for the piston.

A discharge pipe 31 (FIG. 2) having a check valve 32 therein, opens into the cylinder 13 at the lower side of the latter through the head 14. This valve 32 is urged by spring 33 to a closed position during retraction of the piston 17 from head 14 in a direction toward head 15.

From valve 32, pipe 31 extends into one end of a dispensing needle valve body designated 34 (FIG. 1).

Body 34 mounts a conventional needle valve having a handle 34' for adjusting the same to effect a metering of the fluid in pipe 31.

Pipe 31 extends from the valve body 34 to a juncture with a pipe 35 that extends to the mixing chamber 8, and a pipe 36 extends from the mixing chamber 8 to an automatically winding reel 37 where it connects with one end of a flexible hose or tube 38 on said reel. The opposite end of tube 38 is connected with one end of a manually actuatable dispensing valve mechanism generally designated 39.

In the foregoing, it is to be noted that all of the elements described except the dispensing valve mechanism and a small portion of tube 38 are within the heat insulated housing 1, and these latter parts may be stored in said housing when not in use if desired. Thus all of the elements are kept warm by heat from the tank 2, and while the temperature of the water in tank 2 may vary with the results desired, this temperature is normally kept at approximately 135° F. where the device is used for external and internal body irrigation or for douche purposes.

The dispensing valve mechanism (FIG. 3) comprises an elongated cylindrical body 40 having a head 59 at one end through which a passageway 41 opens into the body 40, which passageway is adapted to receive a nipple connecting it with the tube 38 (FIG. 1).

The end of passageway 41 that opens into the body 40 is adapted to be closed by a ball valve 42 (FIG. 3) that is yieldably held against a valve seat around the open inner end of passageway by a spring 43 reacting between valve 42 and an apertured partition 44 approximately centrally disposed within body 40.

At the end of the body 40 opposite to passageway 41 is a head 45 having a nozzle receiving passageway 46 extending therethrough, and the end of passageway 46 that opens into the body 40 is adapted to be closed by a ball valve 47. A spring 48 reacts between ball 47 and partition 44 to yieldably hold the ball in position closing passageway 46.

This passageway 46 has an O-ring 49 therein adapted to form a seal with tubular shank 50 (FIG. 1) of a conventional douche nozzle 51 (dot-dash lines in FIG. 3) or any other desired type of nozzle. This shank has a radially outwardly projecting annular flange 52 (FIGS. 1, 3) thereon adapted to fit within an annular recess 53 (FIG. 3) found in head 45. Upon insertion of shank 50 into passageway 46 until flange 52 is in recess 53, the end of the shank will move ball 47 off its seat and liquid within body 40 will flow into openings 54 (FIGS. 1, 3) in the inner end of the shank 50 and through the latter to the nozzle for discharge from the latter.

A latch 55 pivotally supported at 56 on head 45 is spring urged by a spring 57 to latch over flange 52 when the latter is in recess 53 for holding the nozzle on the body 40.

At the opposite end of body 40 from head 45, a valve actuating pin 58 extends through the head 59 that is at said opposite end and into engagement with ball 42. A finger actuatable lever 60 pivotally connected at 61 to head 59 is adapted to engage the outer end of pin 58 for forcing ball 42 off its seat when lever 60 as seen in FIG. 3 is pressed downwardly.

In operation, the valve 34 is adjusted to deliver to the mixing chamber a uniform volume, per minute, of the solution in the pump 12 upon the solenoid 25 being energized, and which rate of flow and volume is determined by the results desired, as is the pressure of the water entering the mixing chamber from pipe 7. The amount of the chemical solution in the pump in the present instance is definitely fixed although the regulation of the stroke of the piston in the pump may be varied to vary the amount. However, with each stroke of the piston the same volume of the solution will be discharged into the mixing chamber at a predetermined rate, and it will be under controlled pressure, rather than by gravity.

No discharge, however, can take place from the dispensing valve mechanism, unless the shank of the discharge nozzle is properly secured to the dispensing valve mechanism. However, when the nozzle shank is so secured to the dispensing valve mechanism, a pressure on the valve lever 60 will open the dispensing valve mechanism to flow of liquid from the mixing chamber which will cause an instant reduction in the pressure in the pipe 7 at the switch 10 that will close the circuit 63 in which the solenoid 25 is positioned, thereby causing solenoid to actuate the pump 12 to discharge the solution therein into the mixing chamber 8 for mixing with the water that passes to the nozzle 51 and that is discharged therefrom.

The heating element 4 and thermostat 6 are always in the electrical circuit 5 for closing the circuit to the heating element by the thermostat upon a reduction in the temperature of the water in tank 2, and the circuit is broken by the thermostat when the desired temperature is reached.

Immediately upon the charge of the solution in the pump 12 being exhausted, fresh water from the tank will be discharged from nozzle 51, thereby effecting a rinse of the parts to which the mixture was applied, if the dispensing valve mechanism is held open. In many instances this is highly desirable.

Upon closing the dispensing valve by releasing the lever 60, the flow of liquid from the dispensing valve will cease and the solenoid 25 will be de-energized due to equalization of pressure in the pipe 7 at the point of pressure actuated switch 10, and the pump 12 will be recharged for another operation.

In the event a continuous mixture of water and the chemical is desired, the switch 64 in circuit 63 may be opened and switch 65 in lines 63' that connect circuit 63 with the motor of a rotary pump 66 may be closed. A receptacle 67 containing the desired chemical solution is connected by pipe 68 with the pump and a pipe 69 connects pump 66 with the pipe 35 leading to the mixing chamber. With this arrangement the pump 66 will pump the chemical past a metering valve 70 in pipe 69 that corresponds to valve 34, to the mixing chamber 8 as long as the dispensing valve mechanism is open for discharge of liquid from the nozzle 51.

While FIG. 1 shows the apparatus with only one continuous discharge system, and only one system for dispensing a measured charge of a chemical solution followed by a rinse of clear water, it is obvious that any number of either of the two systems may be added by merely duplicating the combinations of FIG. 4 or 5 or both in the electrical circuits with a separate switch such as 64 or 65 for each combination.

The fact that all of the apparatus with the possible exception of the manually actuatable discharge valve and the nozzle, are within the insulated housing, and derive their heat from the tank 2 which is thermostatically controlled, insures against the temperature of mixture being materially changed by being required to flow through pipes, valves, etc. that may be cold. In the present instance, the mixture or liquid to be discharged is at substantially the desired temperature at all times.

The fact that no discharge can take place until the nozzle is in place in the handpiece or manually actuated dispensing valve, insures to a great degree against any accidental discharge of liquid from the handpiece, until the user is ready for using the device.

Inasmuch as positive uniform feed of the chemical under a predetermined uniform pressure and rate of flow from receptacle 11 for mixing with the equally positive feed of liquid from tank 2, also at a uniform pressure and rate, is obtained, the mixture discharged is uniform and is discharged at a uniform pressure and rate of flow, which is highly desirable, particularly where a gentle discharge of the mixture at a relatively low rate is desired, since such results are not satisfactorily obtained where gravity flow is relied upon, or where an injector is used to draw liquid into the dispensing stream.

The pressure control valve 9, of course, is adjustable to regulate the pressure of the liquid in pipe 7 leading therefrom to the mixing chamber, and to thereby regulate the volume of flow per minute desired, however, a flow control valve 75 may be positioned in pipe 7 leading to the pressure control valve 9.

We claim:

1. Apparatus for mixing liquids, including water, and for discharging the resultant mixture into body cavities, wounds and the like of persons for cleansing, sanitizing, and treating the tissues thereof comprising: a closed tank for water, a receptacle for a different liquid, a mixing chamber, a first pipe and a second pipe respectively connecting said tank and said receptacle with said mixing chamber, a continuous source of water under substantially constant predetermined pressure higher than the pressure at which the mixture of water and said different liquid is to be discharged from said mixing chamber connected with said tank for maintaining said tank filled with water under said predetermined pressure and for moving said water from said tank and through said first pipe to said mixing chamber, first control means in said second pipe for positively moving a predetermined amount per minute of said different liquid from said receptacle through said second pipe into said mixing chamber, separate control means in said first pipe for controlling the pressure of the water moved through said first pipe into said mixing chamber and for controlling the volume of flow per minute of said water through said first pipe into said mixing chamber, a relatively long flexible tube for conducting the mixture from said mixing chamber to a discharge nozzle, means connecting one end of said tube with said mixing chamber, a discharge nozzle at the opposite end of said tube adapted to be inserted into a body opening and body cavity in a person and a manually actuatable valve in said tube for controlling the discharge of said mixture from said discharge nozzle.

2. In a mixing and dispensing apparatus for mixing liquids and for dispensing the mixture thereof, said apparatus including a tank for one liquid, a receptacle for another liquid, a mixing chamber, and a manually actuatable dispensing valve, a first conduit and a second conduit respectively connecting said tank and said receptacle with said mixing chamber for flow of liquid from said tank and from said receptacle to said mixing chamber, a discharge tube connecting said mixing chamber with said manually actuatable dispensing valve, said second conduit connecting said receptacle with said mixing chamber including an enlarged portion therein providing a compartment adapted to receive a predetermined amount of liquid from said receptacle, a piston reciprocable in said compartment for moving said amount of liquid through said second conduit into said mixing chamber upon movement of said piston in one direction in said compartment, means for maintaining the liquid in said tank and in said first conduit under pressure for flow of the liquid in said tank and conduit into said mixing chamber upon actuation of said manually actuatable dispensing valve to open said discharge tube and dispensing valve to discharge liquid from said mixing chamber through said dispensing valve, an electrical circuit, a pressure actuatable switch in said first conduit and in said circuit actuatable for closing said switch and circuit upon a drop in pressure in said first conduit due to opening said dispensing valve, and electrically actuatable means in said second conduit and in said circuit actuatable for moving said piston in said one direction upon closing said switch, whereby liquid from said tank and from said receptacle will simultaneously, and positively, be moved into said mixing chamber upon said dispensing valve being opened.

3. In a mixing and dispensing apparatus for mixing liquids and for dispensing the mixture thereof, said apparatus including a tank for one liquid, a receptacle for another liquid, a mixing chamber, and a manually actuatable dispensing valve, a first conduit and a second conduit respectively connecting said tank and said receptacle with said mixing chamber for flow of liquid from said tank and from said receptacle to said mixing chamber, a discharge tube connecting said mixing chamber with said manually actuatable dispensing valve, said second conduit connecting said receptacle with said mixing chamber including an enlarged portion therein providing a compartment adapted to receive a predetermined amount of liquid from said receptacle, a piston reciprocable in said compartment for moving said amount of liquid through said second conduit into said mixing chamber upon movement of said piston in one direction in said compartment, means for maintaining the liquid in said tank and in said first conduit under pressure for flow of the liquid in said tank and conduit into said mixing chamber upon actuation of said manually actuatable dispensing valve to open said discharge tube and dispensing valve to discharge liquid from said mixing chamber through said dispensing valve, an electrical circuit, a pressure actuatable switch in said first conduit and in said circuit actuatable for closing said switch and circuit upon a drop in pressure in said first conduit due to opening said dispensing valve, and electrically actuatable means in said second conduit and in said circuit actuatable for moving said piston in said one direction upon closing said switch, whereby liquid from said tank and from said receptacle will simultaneously, and positively, be moved into said mixing chamber upon said dispensing valve being opened, said manually actuatable dispensing valve including a normally closed valve, a discharge nozzle, means on said dispensing valve for releasably securing said discharge nozzle thereto, and said normally closed valve being in a position for engagement by said nozzle when said nozzle is secured to said dispensing valve, and for movement to an open position under the influence of said nozzle upon said nozzle being secured to said dispensing valve, said latter valve including a manually actuatable member for moving said dispensing valve to open position.

4. In a mixing and dispensing apparatus of the character described including a tank for one liquid and a receptacle for another liquid and a mixing chamber, a first conduit connecting said mixing chamber with said tank and a second conduit connecting said receptacle with said mixing chamber, a manually actuatable dispensing valve and a discharge tube connecting said mixing chamber with said manually actuatable dispensing valve, said second conduit including a pump cylinder having an inlet opening in one end and an outlet opening at the opposite end for flow of liquid from receptacle into said inlet and for discharge of liquid through said outlet to said mixing chamber, a piston reciprocable within said cylinder for movement from said one end thereof to said opposite end and vice versa, said piston including a check valve therein for closing said piston to flow of liquid therethrough upon movement of said piston toward said opposite end and for opening said piston for flow of liquid therethrough upon reverse movement of said piston toward said one end, means for varying the degree of movement of said piston toward said opposite end as desired to thereby regulate the amount of liquid discharged from said cylinder, and yieldable driving means connecting said piston with a source of power for moving said piston toward said opposite end, electrically actuatable means connected with said driving means for driving the latter, and means actuatable upon discharge of liquid from said dispensing valve for connecting said electrically actuatable means in an electrical circuit for causing said actuation of said electrically actuatable means.

5. In a mixing and dispensing apparatus of the character described including a tank for one liquid and a receptacle for another liquid and a mixing chamber, a first conduit connecting said mixing chamber with said tank and a second conduit connecting said mixing chamber with said receptacle, a discharge tube connected at one end thereof with said mixing chamber, a manually actuatable dispensing valve body connected with the other end of said discharge tube, said dispensing valve body having a through passageway opening at one end thereof into said one end of said tube, an inlet valve in said body adjacent to said inlet movable to and from a closed position closing said inlet to flow of liquid from said tube into said inlet, an outlet valve in said body adjacent to said outlet movable from a normally closed position closing said outlet to flow of liquid from said body to an open position permitting said flow, yieldable means in said body respectively yieldably holding said inlet valve and said outlet valve in their respective closed positions, said outlet being adapted to releasably hold a discharge nozzle therein, a discharge nozzle, and means on said discharge nozzle engageable with said outlet valve for moving the latter to its said open position upon said nozzle being secured in said outlet, and means movable under manual actuation engageable with said inlet valve for moving the latter to open position upon manual actuation of said last mentioned means.

6. In a mixing and dispensing apparatus of the character described including a tank for one liquid and a receptacle for another liquid and a mixing chamber, a first conduit connecting said mixing chamber with said tank and a second conduit connecting said mixing chamber with said receptacle, a discharge tube connected at one end thereof with said mixing chamber, a manually actuatable dispensing valve body connected with the other end of said discharge tube, said dispensing valve body having a through passageway opening at one end thereof into said one end of said tube, an inlet valve in said body adjacent to said inlet movable to and from a closed position closing said inlet to flow of liquid from said tube into said inlet, an outlet valve in said body adjacent to said outlet movable from a normally closed position closing said outlet to flow of liquid from said body to an open position permitting said flow, yieldable means in said body respectively yieldably holding said inlet valve and said outlet valve in their respective closed positions, said outlet being adapted to releasably hold a discharge nozzle therein, a discharge nozzle, and means on said discharge nozzle engageable with said outlet valve for moving the latter to its said open position upon said nozzle being secured in said outlet, and means movable under manual actuation engageable with said inlet valve for moving the latter to open position upon manual actuation of said last mentioned means, means for maintaining the liquid in said tank and in said first conduit under pressure for discharge of such liquid into said mixing chamber upon liquid being discharged from said mixing chamber through said tube and from said nozzle, and an electrically actuatable pump in said second conduit for positively pumping liquid in said second conduit into said mixing chamber simultaneously with said movement of liquid in said first conduit into said mixing chamber.

References Cited in the file of this patent
UNITED STATES PATENTS

| | | |
|---|---|---|
| 817,009 | Schultz | Apr. 3, 1906 |
| 2,058,780 | Elliott | Oct. 27, 1936 |
| 2,847,196 | Franklin et al. | Aug. 12, 1958 |